US010166492B2

(12) United States Patent
Yu et al.

(10) Patent No.: US 10,166,492 B2
(45) Date of Patent: Jan. 1, 2019

(54) BUBBLE REMOVING UNIT AND SUBSTRATE TREATING APPARATUS INCLUDING THE SAME

(71) Applicant: Semes Co., Ltd., Chungcheongnam-do (KR)

(72) Inventors: Jaehyeok Yu, Chungcheongnam-do (KR); Jae-Youl Kim, Gyeonggi-do (KR); Oh Jin Kwon, Chungcheongnam-do (KR)

(73) Assignee: Semes Co., Ltd., Chungcheongnam-do (KR)

( * ) Notice: Subject to any disclaimer, the term of this patent is extended or adjusted under 35 U.S.C. 154(b) by 177 days.

(21) Appl. No.: 15/195,225

(22) Filed: Jun. 28, 2016

(65) Prior Publication Data

US 2017/0001127 A1 Jan. 5, 2017

(30) Foreign Application Priority Data

Jun. 30, 2015 (KR) .................. 10-2015-0093159

(51) Int. Cl.
*B01D 19/00* (2006.01)
(52) U.S. Cl.
CPC ..... *B01D 19/0057* (2013.01); *B01D 19/0052* (2013.01)
(58) Field of Classification Search
CPC ....................................... B01D 19/00–19/0495
USPC ..................... 96/155–220; 156/345.1–345.55
See application file for complete search history.

(56) References Cited

U.S. PATENT DOCUMENTS 6,471,756 B1 * 10/2002 Satoh ................. B01D 19/0057
96/165

FOREIGN PATENT DOCUMENTS

| CN | 2493625 Y | 5/2002 |
|---|---|---|
| CN | 1991594 A | 7/2007 |
| CN | 102188918 A | 9/2011 |
| KR | 10-2011-0103093 A | 9/2011 |
| KR | 10-1068872 | 9/2011 |
| KR | 20-2012-0007763 | 11/2012 |
| KR | 10-1342147 | 12/2013 |
| KR | 10-2014-0018130 | 2/2014 |
| KR | 10-1487364 | 1/2015 |

* cited by examiner

*Primary Examiner* — T. Bennett McKenzie
(74) *Attorney, Agent, or Firm* — Jenkins, Wilson, Taylor & Hunt, P.A.

(57) ABSTRACT

A bubble removing unit is disclosed including a body having an inner space, through which a liquid flows, in an interior thereof, a liquid introducing pipe through which the liquid is supplied to the body, a liquid discharging pipe through which the liquid, from which bubbles are removed, is discharged from the body, a bubble discharging pipe through which the bubbles are discharged from the inner space, and a rod-shaped bar situated in the inner space and a length of which extends in a lengthwise direction of the body, wherein a variable cross-section part situated between the liquid introducing pipe and the liquid discharging pipe and a cross-section of which varies along the lengthwise direction of the body is provided in the inner space of the body.

18 Claims, 8 Drawing Sheets

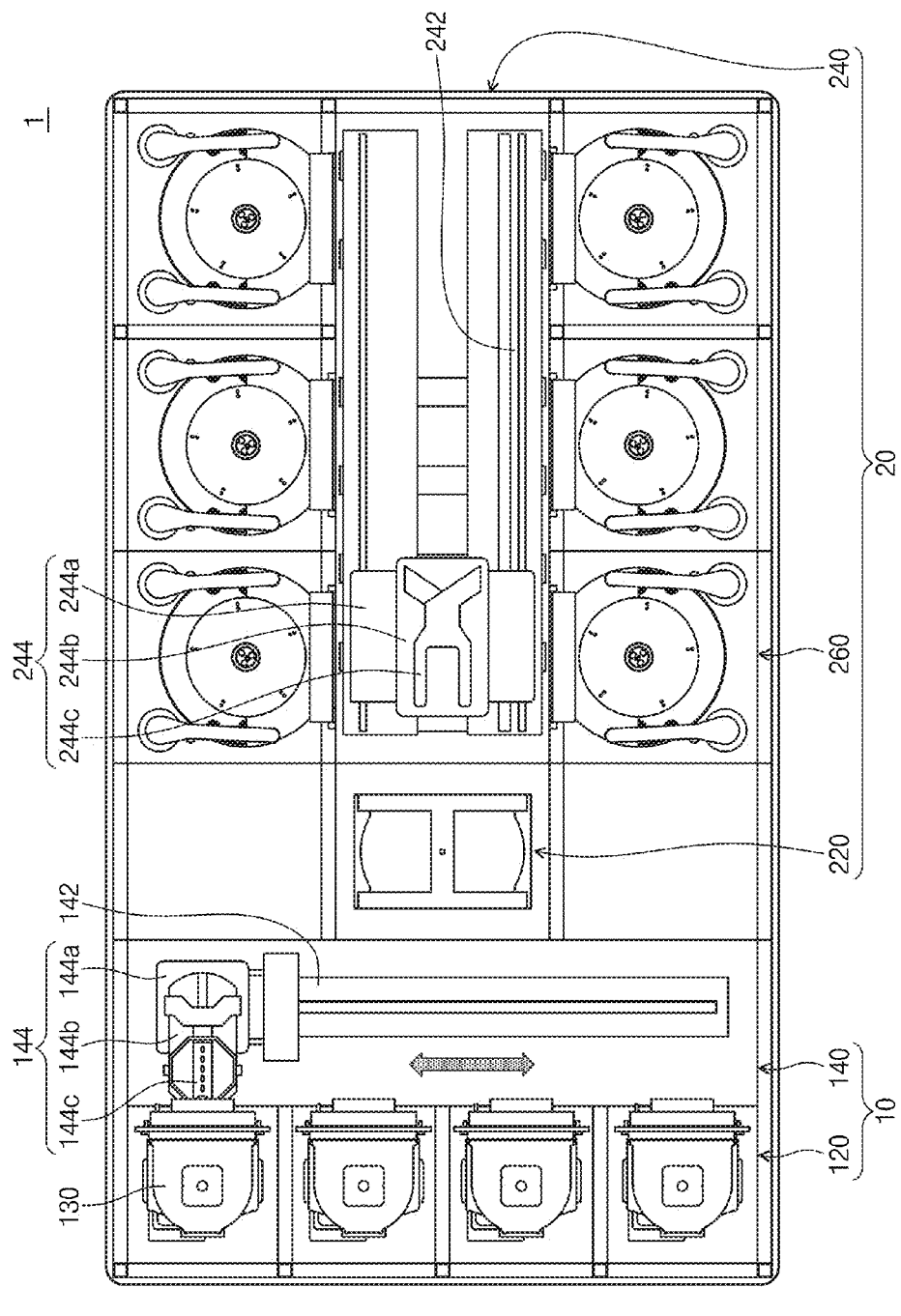
FIG. 1
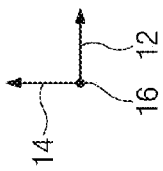

BUBBLE REMOVING UNIT AND SUBSTRATE TREATING APPARATUS INCLUDING THE SAME

CROSS-REFERENCE TO RELATED APPLICATION

A claim for priority under 35 U.S.C. § 119 is made to Korean Patent Application No. 10-2015-0093159 filed Jun. 30, 2015, in the Korean Intellectual Property Office, the entire content of which is incorporated by reference herein.

BACKGROUND

The inventive concept relates to a bubble removing unit that removes bubbles from a liquid and a substrate treating apparatus including the same.

In general, in a process of manufacturing flat panel display devices or semiconductors, various processes such as a photoresist coating process, a developing process, an etching process, and an ashing process are performed in a process of treating a glass substrate or a wafer.

In particular, as circuit patterns have rapidly become finer as the semiconductor devices have had high density, high integration, and high performance, contaminants such as particles, organic contaminants, metallic contaminant residing on a surface of a substrate greatly influence the characteristics and throughput of the devices. Due to this, a cleaning process of removing various contaminants attached to a surface of a substrate is very important, and a process of cleaning a substrate is performed before and after unit processes for manufacturing a semiconductor.

Meanwhile, in a process of manufacturing a substrate, various chemicals are supplied onto a substrate to perform a liquid treating process. The chemicals supplied onto the substrate may be naturally oxidized according to the chemical characteristics thereof and may generate bubbles. When the chemical having bubbles is supplied onto the substrate, the efficiency of the liquid treating process is lowered.

Accordingly, it is necessary to remove bubbles existing in the chemical before the chemical is supplied to the substrate.

SUMMARY

The inventive concept provides a bubble removing unit that removes bubbles existing in a liquid and a substrate treating apparatus including the same.

The problems that are to be solved by the inventive concept are not limited to the above-mentioned problems, and the unmentioned problems will be clearly understood by those skilled in the art to which the inventive concept pertains from the specification and the accompanying drawings.

The inventive concept provides a bubble removing unit.

In accordance with an aspect of the inventive concept, there is provided a bubble removing unit including a body having an inner space, through which a liquid flows, in an interior thereof, a liquid introducing pipe through which the liquid is supplied to the body, a liquid discharging pipe through which the liquid, from which bubbles are removed, is discharged from the body, a bubble discharging pipe through which the bubbles are discharged from the inner space, and a rod-shaped bar situated in the inner space and a length of which extends in a lengthwise direction of the body, wherein a variable cross-section part situated between the liquid introducing pipe and the liquid discharging pipe and a cross-section of which varies along the lengthwise direction of the body is provided in the inner space of the body.

According to an embodiment, a large cross-section part situated at any one of an upper portion and a lower portion of the variable cross-section part, extending from one end of the variable cross-section part, and having a cross-section that is greater than that of the variable cross-section part, and a small cross-section part situated at the other of the upper portion and the lower portion of the variable cross-section part, extending from an opposite end of the variable cross-section part, and having a cross-section that is smaller than that of the variable cross-section part may be further provided in the inner space of the body.

According to an embodiment, the liquid introducing pipe may be connected to the large cross-section part, the liquid discharging pipe may be connected to the small cross-section part, and the large cross-section part may be situated at a location higher than that of the small cross-section part.

According to an embodiment, the bubble discharging pipe may be connected to an upper surface of the body.

According to an embodiment, the large cross-section part and the small cross-section part may have the same cross-sections along lengthwise directions thereof.

According to an embodiment, a cross-section of the variable cross-section part may become smaller as it goes along a lengthwise direction thereof.

According to an embodiment, the variable cross-section part may have a conic shape, an area of which is larger on an upper surface thereof than on a lower surface thereof.

According to an embodiment, a coupling recess, to which the bar is fixed, may be formed on a bottom surface of the body, and the bar may be coupled to the coupling recess.

According to an embodiment, a height of the bar may be larger than a height of the small cross-section part, and an uppermost surface of the bar may be situated at a location lower than an upper side of the variable cross-section part.

According to an embodiment, the bar may have a spiral groove on an outer surface thereof.

According to an embodiment, the liquid introducing pipe may be connected to an inner wall of the body in a tangential direction of the inner wall such that the liquid swirls along the inner wall when the liquid is introduced into the inner space.

According to an embodiment, the spiral groove may be formed in a direction opposite to a direction in which the liquid swirled in the inner space.

The inventive concept provides an apparatus for treating a substrate.

In accordance with another aspect of the inventive concept, there is provided an apparatus for treating a substrate, the apparatus including a container having a treatment space in the interior thereof, a support unit situated in the treatment space to support the substrate, a liquid supply unit that supplies a liquid to a substrate positioned on the support unit, and a bubble removing unit that removes bubbles from the liquid supplied by the liquid supply unit, wherein the bubble removing unit includes a body having a space, through which a liquid flows, in an interior thereof, a liquid introducing pipe through which the liquid is supplied to the body, a liquid discharging pipe through which the liquid, from which bubbles are removed, is discharged from the body, a bubble discharging pipe through which the bubbles are discharged from the inner space and connected to an upper surface of the body, and a rod-shaped bar situated in the inner space and a length of which extends in a lengthwise direction of the body, and wherein a variable cross-section part situated between the liquid introducing pipe and the liquid discharging pipe and a cross-section of which varies along the lengthwise direction of the body is provided in the inner space of the body.

According to an embodiment, a large cross-section part situated at any one of an upper portion and a lower portion of the variable cross-section part, extending from one end of the variable cross-section part, and having a cross-section that is greater than that of the variable cross-section part, and a small cross-section part situated at the other of the upper portion and the lower portion of the variable cross-section part, extending from an opposite end of the variable cross-section part, and having a cross-section that is smaller than that of the variable cross-section part are further provided in the inner space of the body, and the liquid introducing pipe may be connected to the large cross-section part, the liquid discharging pipe may be connected to the small cross-section part, and the large cross-section part may be situated at a location higher than that of the small cross-section part.

According to an embodiment, the large cross-section part and the small cross-section part may have the same cross-sections along lengthwise directions thereof.

According to an embodiment, the variable cross-section part may have a conic shape, an area of which is larger on an upper surface thereof than on a lower surface thereof.

According to an embodiment, a coupling recess, to which the bar is fixed, may be formed on a bottom surface of the body, and the bar may be coupled to the coupling recess.

According to an embodiment, a height of the bar may be larger than a height of the small cross-section part, and an uppermost surface of the bar may be situated at a location lower than an upper side of the variable cross-section part.

According to an embodiment, the bar may have a spiral groove on an outer surface thereof.

According to an embodiment, the liquid introducing pipe may be connected to an inner wall of the body in a tangential direction of the inner wall such that the liquid swirls along the inner wall when the liquid is introduced into the inner space, and the spiral groove is formed in a direction opposite to a direction in which the liquid swirled in the inner space.

BRIEF DESCRIPTION OF THE DRAWINGS

The above and other objects and features will become apparent from the following description with reference to the following figures, wherein like reference numerals refer to like parts throughout the various figures unless otherwise specified, and wherein:

FIG. 1 is a plan view illustrating a substrate treating system according to an embodiment of the inventive concept;

DETAILED DESCRIPTION

Figure 2:
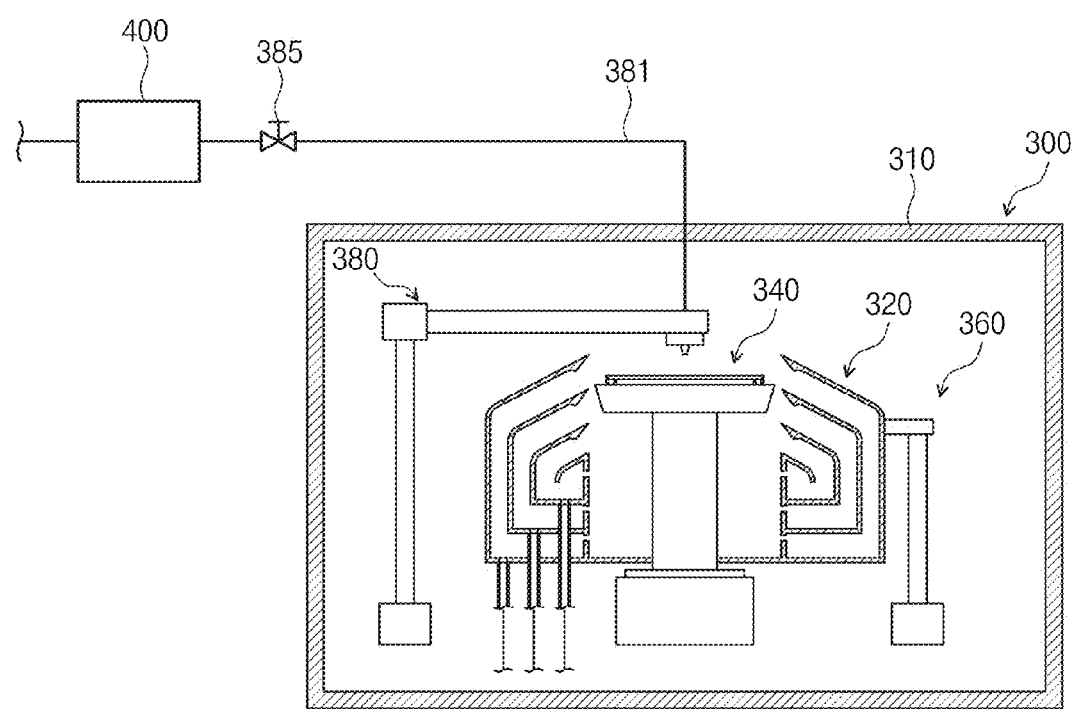
FIG. 2 is a view schematically illustrating a configuration of the substrate treating system provided in a process chamber of FIG. 1.

Hereinafter, exemplary embodiments of the inventive concept will be described in more detail with reference to the accompanying drawings. The embodiments of the inventive concept may be modified in various forms, and the scope of the inventive concept should not be construed to be limited to the following embodiments. The embodiments of the inventive concept are provided to describe the inventive concept for those skilled in the art more completely. Accordingly, the shapes of the components of the drawings are exaggerated to emphasize clearer description thereof.

The embodiments of the inventive concept may be modified in various forms, and the scope of the inventive concept should not be construed to be limited by the embodiments of the inventive concept described in the following. The embodiments of the inventive concept are provided to describe the inventive concept for those skilled in the art more completely. Accordingly, the shapes and the like of the components in the drawings are exaggerated to emphasize clearer descriptions.

FIG. 1 is a plan view illustrating a substrate treating system according to an embodiment of the inventive concept. Referring to FIG. 1, the substrate treating system 1 includes an index module 10 and a process executing module 20. The index module 10 includes a plurality of load ports 120 and a feeding frame 140. The load port 120, the feeding frame 140, and the process treating module 20 may be sequentially arranged in a row. Hereinafter, a direction in which the load port 120, the feeding frame 140, and the process treating module 20 will be referred to a first direction 12. A direction perpendicular to the first direction 12 when viewed from the top will be referred to as a second direction 14, and a direction normal to a plane including the first direction 12 and the second direction 14 will be referred to as a third direction 16.

A carrier 130, in which a substrate W is received, is seated on the load port 120. A plurality of load ports 120 are provided, and are arranged along the second direction 14 in a row. FIG. 1 illustrates that four load ports 120 are provided. However, the number of the load ports 120 may increase or decrease according to a condition, such as the process efficiency of the process treating module 20 or a footprint. A plurality of slots (not illustrated) provided to support peripheries of substrates W are formed in the carrier 130. A plurality of slots are provided along the third direction 16, and the substrate W is situated in the carrier 130 such that the substrates W are stacked to be spaced apart from each other along the third direction 16. A front opening unified pod (FOUP) may be used as the carrier 130.

The process treating module 20 includes a buffer unit 220, a feeding chamber 240, and a plurality of process chambers 260. The feeding chamber 240 is arranged such that the lengthwise direction thereof is in parallel to the first direction 12. The process chambers 260 are arranged on opposite sides of the feeding chamber 240 along the second direction 14. The process chambers 260 situated on one side of the feeding chamber 240 and the process chambers 260 situated on an opposite side of the feeding chamber 240 are symmetrical to each other with respect to the feeding chamber 240. Some of the process chambers 260 are arranged along the lengthwise direction of the feeding chamber 240. Furthermore, some of the process chambers 260 are arranged to be stacked on each other. That is, the process chambers 260 having an array of A by B (A and B are natural numbers) may be arranged on one side of the feeding chamber 240. Here, A is the number of the process chambers 260 provided in a row along the first direction 12, and B is the number of the process chambers 260 provided in a row along the third direction 16. When four or six process chambers 260 are provided on one side of the feeding chamber 240, the process chambers 260 may be arranged in an array of 2 by 2 or 3 by 2. The number of the process chambers 260 may increase or decrease. Unlike the above-mentioned description, the process chambers 260 may be provided only on one side of the feeding chamber 240. Further, unlike the above-mentioned description, the process chambers 260 may be provided on one side or opposite sides of the feeding chamber 240 to form a single layer.

A buffer unit 220 is arranged between the feeding frame 140 and the feeding chamber 240. The buffer unit 220 provides a space in which the substrates W stay before being transported, between the feeding chamber 240 and the feeding frame 140. Slots (not illustrated) in which the substrates W are positioned are provided in the buffer unit 220, and a plurality of slots (not illustrated) are provided to be spaced apart from each other along the third direction 16. Faces of the buffer unit 220 that faces the feeding frame 140 and faces the feeding chamber 240 are opened.

The feeding frame 140 transports the substrates W between the carrier 130 seated on the load port 120 and the buffer unit 220. An index rail 142 and an index robot 144 are provided in the feeding frame 140. The index rail 142 is arranged such that the lengthwise direction thereof is in parallel to the second direction 14. The index robot 144 is installed on the index rail 142, and is linearly moved in the second direction 14 along the index rail 142. The index robot 144 has a base 144a, a body 144b, and a plurality of index arms 144c. The base 144a is installed to be moved along the index rail 142. The body 144b is coupled to the base 144a. The body 144b is provided to be moved along the third direction 16 on the base 144a. The body 144b is provided to be rotated on the base 144a. The index arms 144c are coupled to the body 144b, and are provided to be moved forwards and rearwards with respect to the body 144b. A plurality of index arms 144c are provided to be driven individually. The index arms 144c are arranged to be stacked so as to be spaced apart from each other along the third direction 16. Some of the index arms 144c are used when the substrates W are transported to the carrier 130 in the process treating module 20, and some of the index arms 144c may be used when the substrates W are transported from the carrier 130 to the process treating module 20. This structure may prevent particles generated from the substrates W before the process treatment from being attached to the substrates W after the process treatment in the process of carrying the substrates W in and out by the index robot 144.

The feeding chamber 240 transports the substrates W between the buffer unit 220 and the process chambers 260 and between the process chambers 260. A guide rail 242 and a main robot 244 are provided in the feeding chamber 240. The guide rail 242 is arranged such that the lengthwise direction thereof is in parallel to the first direction 12. The main robot 244 is installed on the guide rail 242, and is linearly moved along the first direction 12 on the index rail 242. The main robot 244 has a base 244a, a body 244b, and a plurality of main arms 244c. The base 244a is installed to be moved along the guide rail 242. The body 244b is coupled to the base 244a. The body 244b is provided to be moved along the third direction 16 on the base 244a. The body 244b is provided to be rotated on the base 244a. The main arms 244c are coupled to the body 244b, and are provided to be moved forwards and rearwards with respect to the body 244b. A plurality of main arms 244c are provided to be driven individually. The main arms 244c are arranged to be stacked so as to be spaced apart from each other along the third direction 16. The main arms 244c used when the substrates W are transported from the buffer unit 220 to the process chambers 260 and the main arms 244 used when the substrates W are transported from the process chambers 260 to the buffer unit 220 may be different.

Substrate treating apparatuses 300 that perform cleaning processes on the substrates W are provided in the process chambers 260. The substrate treating apparatuses 300 provided in the process chambers 260 may have different structures according to the types of performed cleaning processes. Selectively, the substrate treating apparatuses 300 in the process chambers 260 may have the same structure. Selectively, the process chambers 260 may be classified into a plurality of groups such that the structures of the substrate treating apparatuses 300 in the process chambers 260 pertaining to the same group are the same and the structures of the substrate treating apparatuses 300 in the process chambers 260 pertaining to different groups are different. For example, when the process chambers 260 are classified into two groups, the first group of process chambers 260 may be provided on one side of the feeding chamber 240 and the second group of process chambers 260 may be provided on an opposite side of the feeding chamber 240. Selectively, the first group of process chambers 260 may be provided on the lower side of the feeding chamber 240 and the second group of process chambers 260 may be provided on the upper side of the feeding chamber 240, on opposite sides of the feeding chamber 240. The first group of process chambers 260 and the second group of process chambers 260 may be classified according to the kinds of the used chemicals or the types of cleaning methods.

Figure 3:
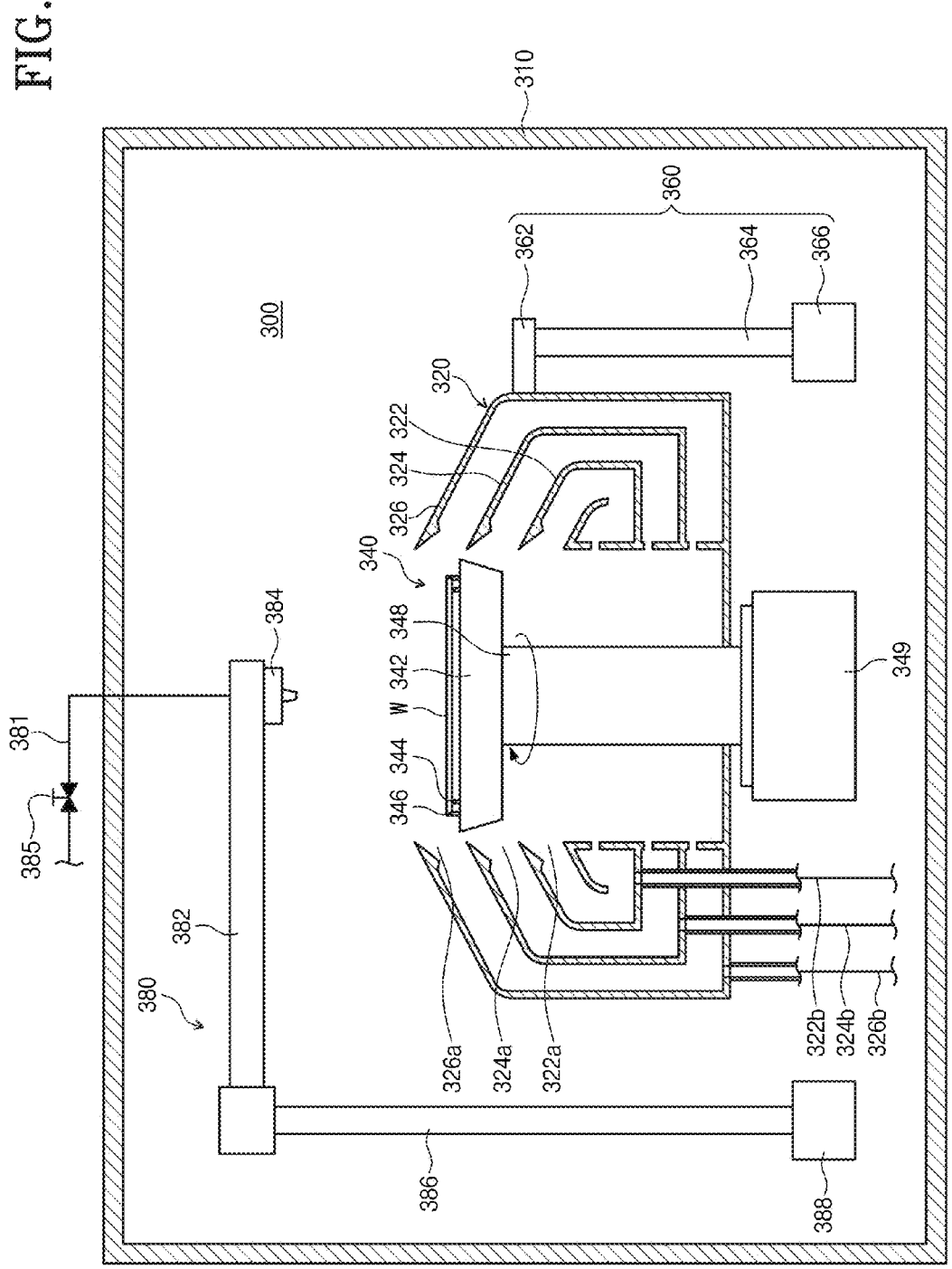
FIG. 3 is a sectional view illustrating the substrate treating apparatus provided in the process chamber of FIG. 1.

Hereinafter, an example of a substrate treating apparatus 300 that cleans a substrate W by using a treatment liquid will be described. FIG. 2 is a view schematically illustrating a configuration of the substrate treating system provided in a process chamber of FIG. 1. FIG. 3 is a sectional view illustrating the substrate treating apparatus provided in the process chamber of FIG. 1. Referring to FIGS. 2 and 3, the substrate treating apparatus 300 includes a container 320, a support unit 340, an elevation unit 360, a liquid supply unit 380, and a bubble removing unit 400.

The container 320 provides a space in which a substrate treating process is performed. The upper side of the container 320 is opened. The container 320 has an inner recovery vessel 322, an intermediate recovery vessel 324, and an outer recovery vessel 326. The recovery vessels 322, 324, and 326 recover different treatment liquids used in the process. The inner recovery vessel 322 is provided to have an annular ring shape that surrounds the support unit 340. The intermediate recovery vessel 324 is provided to have an annular ring shape that surrounds the inner recovery vessel 322. The outer recovery vessel 326 is provided to have an annular ring shape that surrounds the intermediate recovery vessel 324. An inner space 322a of the inner recovery vessel 322, a space 324a between the inner recovery vessel 322 and the intermediate recovery vessel 324, and a space 326a between the intermediate recovery vessel 324 and the outer recovery vessel 326 function as inlets through which the treatment liquids are introduced into the inner recovery vessel 322, the intermediate recovery vessel 324, and the outer recovery vessel 326. Recovery lines 322b, 324b, and 326b extending from the recovery vessels 322, 324, and 326 perpendicularly in the downward direction of the bottom surfaces thereof are connected to the recovery vessels 322, 324, and 326, respectively. The recovery lines 322b, 324b, and 326b discharge the treatment liquids introduced through the recovery vessels 322, 324, 326, respectively. The discharged treatment liquids may be reused through an external treatment liquid recycling system (not illustrated).

The support unit 340 is arranged in the container 320. The support unit 340 supports and rotates the substrate W during the substrate treating process. The support unit 340 includes a body 342, a plurality of support pins 344, a plurality of chuck pins 346, and a support shaft 348. The body 342 has an upper surface having a substantially circular shape when viewed from the top. The support shaft 348 that may be rotated by a motor 349 is fixedly coupled to the bottom of the body 342. A plurality of support pins 344 are provided. The support pins 344 may be arranged to be spaced apart from each other at a periphery of the upper surface of the body 342 and protrude upwards from the body 342. The support pins 344 are arranged to have a generally annular ring shape through combination thereof. The support pins 344 support a periphery of a rear surface of the substrate W such that the substrate W is spaced apart from the upper surface of the body 342 by a predetermined distance.

A plurality of chuck pins 346 are provided. The chuck pins 346 are arranged to be more distant from the center of the body 342 than the support pins 344. The chuck pins 346 are provided to protrude upwards from the body 342. The chuck pins 346 support a side of the substrate W such that the substrate W is not separated laterally from a proper place when the support unit 340 is rotated. The chuck pins 346 are provided to be linearly moved between a standby position and a support position along a radial direction of the body 342. The standby position is a position that is more distant from the center of the body 342 than the support position. When the substrate W is loaded on or unloaded from the support unit 340, the chuck pins 346 are located at the standby position, and when a process is performed on the substrate, the chuck pins 346 are located at the support position. The chuck pins 346 are in contact with the side of the substrate at the support position.

The elevation unit 360 linearly moves the container 320 upwards and downwards. When the container 320 is moved upwards and downwards, a relative height of the container 320 to the support unit 340 is changed. The elevation unit 360 has a bracket 362, a movable shaft 364, and a driver 366.

The bracket 362 is fixedly installed on an outer wall of the container 320. The movable shaft 364 that is moved upwards and downwards by the driver 366 is fixedly coupled to the bracket 362. The container 320 is lowered such that, when the substrate W is positioned on the support unit 340 or is lifted from the support unit 340, the support unit 340 protrudes to the upper side of the container 320. When the process is performed, the height of the container 320 is adjusted such that the treatment liquid is introduced into the preset recovery vessel 360 according to the kind of the treatment liquid supplied to the substrate W.

For example, the substrate W is located at a height corresponding to an inner space 322a of the inner recovery vessel 322 while the substrate W is treated by a first treatment fluid. Further, the substrate W may be located at a height corresponding to a space 324a between the inner recovery vessel 322 and the intermediate recovery vessel 324 and a space 326a between the intermediate recovery vessel 324 and the outer recovery vessel 3265 while the substrate W is treated by a second treatment liquid and a third treatment liquid. Unlike those described above, the elevation unit 360 may move the support unit 340, instead of the container 320, upwards and downwards.

The liquid supply unit 380 supplies a treatment liquid to the substrate W during a process of treating the substrate W. The liquid supply unit 380 includes a liquid supply line 381, a valve 385, a nozzle support 382, a nozzle 384, a support shaft 386, and a driver 388. The lengthwise direction of the support shaft 386 is provided along the third direction 16, and the driver 388 is coupled to a lower end of the support shaft 386. The driver 388 rotates and elevates the support shaft 386. The nozzle support 382 is vertically coupled to an end opposite to an end of the support shaft 386 coupled to the driver 386. The nozzle 384 is installed on a bottom surface of an end of the nozzle support 382. The nozzle 384 is moved to a process location and a standby location by the driver 388. The process location is a location at which the nozzle 384 is arranged at a vertical upper portion of the container 320, and the standby location is a location that deviates from the vertical upper portion of the container 320. The nozzle 382 receives a liquid from the liquid supply line 381 and supplies the liquid onto the substrate W. A valve 385 is installed in the liquid supply line 381. The valve 385 adjusts an amount of liquid supplied to the nozzle 382.

One or a plurality of liquid supply units 380 may be provided. When a plurality of liquid supply units 380 are provided, a chemical, a rinsing liquid, or an organic solvent may be provided through different liquid supply units 380. The rinsing liquid may be pure water, and the organic solvent may be a mixture of isopropyl alcohol vapor and an inert gas or an isopropyl alcohol liquid.

Figure 4:
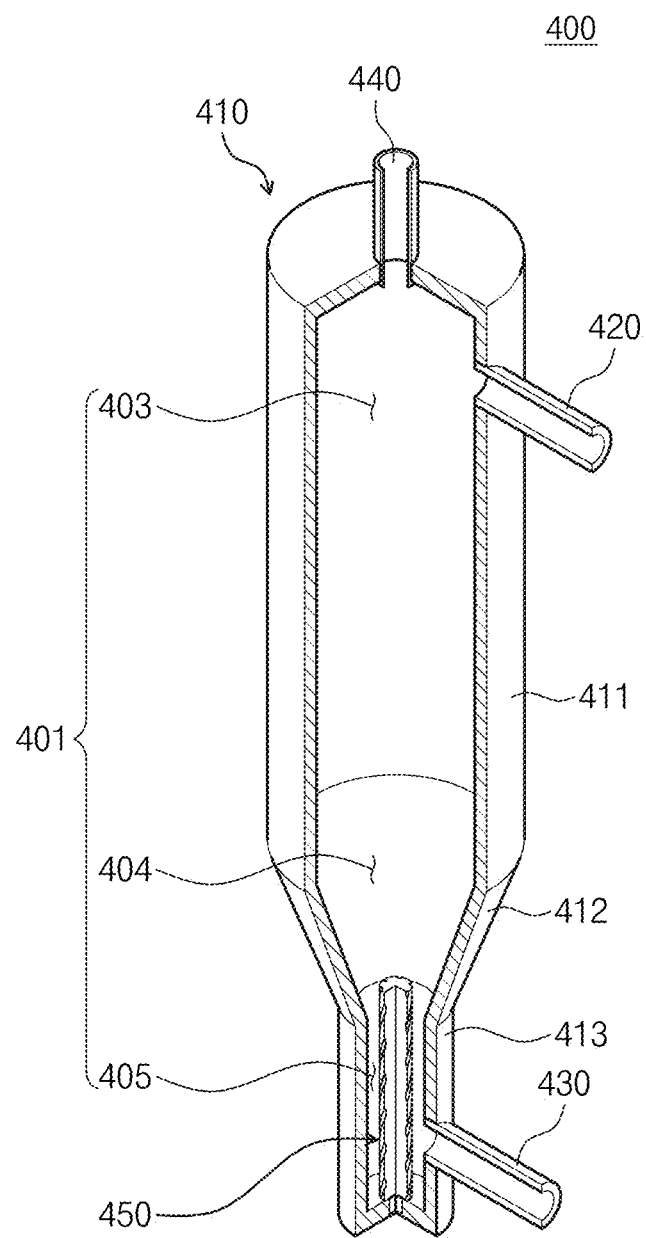
FIG. 4 is a cutaway perspective view illustrating a bubble removing unit according to an embodiment of the inventive concept.
Figure 5:
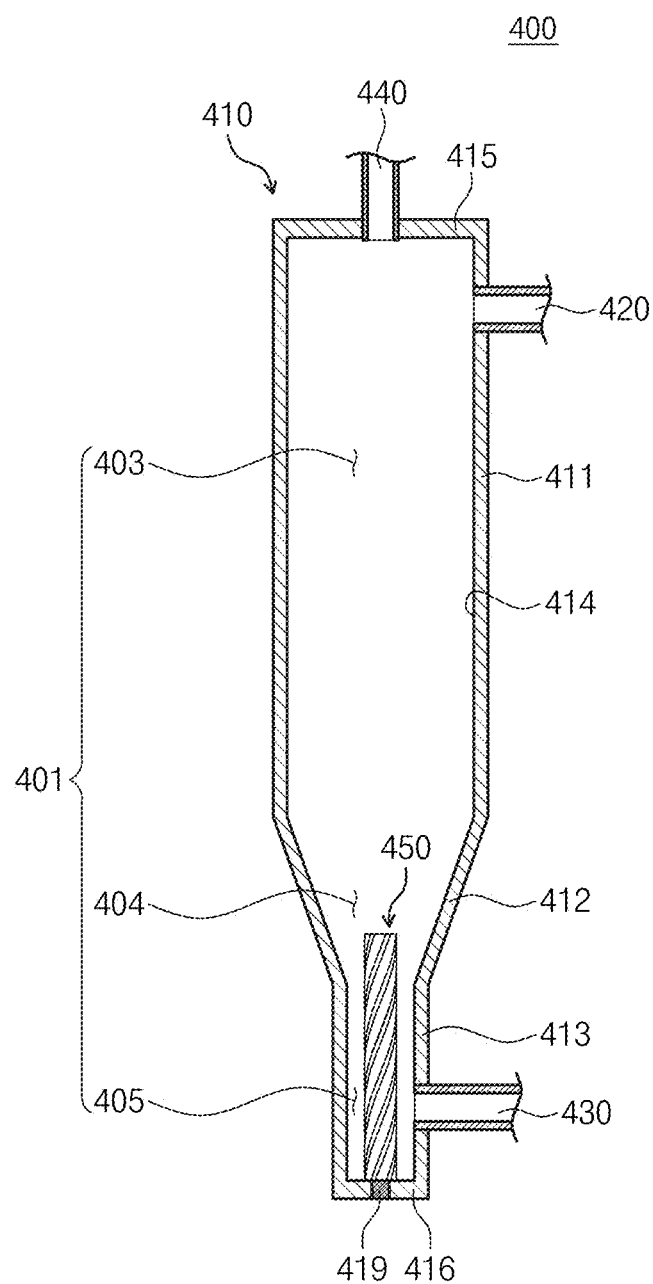
FIG. 5 is a sectional view illustrating the bubble removing unit of FIG. 4.

FIG. 4 is a cutaway perspective view illustrating a bubble removing unit according to an embodiment of the inventive concept. FIG. 5 is a sectional view illustrating the bubble removing unit 400 of FIG. 4. Hereinafter, referring to FIGS. 4 and 5, the bubble removing unit 400 removes bubbles in a liquid. The liquid is a liquid that is supplied onto the substrate W. For example, the liquid supplied to the bubble removing unit 400 may be a liquid in which a plurality of liquids are mixed. The bubble removing unit 400 is connected to the liquid supply unit. The bubble removing unit 400 is connected to the liquid supply line 381 to remove bubbles before the liquid is supplied onto the substrate W.

The bubble removing unit 400 includes a body 410, a liquid introducing pipe 420, a liquid discharging pipe 430, a bubble discharging pipe 440, and a bar 450.

The body 410 has an inner space 401. The inner space 401 is a space through which the liquid supplied from the outside flows. Bubbles are removed while the liquid passes through the inner space 401 of the body 410. The body 410 includes an upper body 411, a variable body 412, and a lower body 413. The upper body 411 has a cylindrical shape. The variable body 412 is situated on the lower side of the upper body 411, and is connected to the upper body 411. The variable body 412 has a shape, a cross-section of which becomes smaller as it goes towards the lower side. The variable body 412 may have a conic shape. The lower body 412 is situated on the lower side of the variable body 412 and is connected to the variable body 412. The lower body 413 has a cylindrical shape. The cross-section of the lower body 413 is smaller than the cross-section of the upper body 411. The body 410 is formed by coupling the upper body 411, the variable body 412, and the lower body 413, and the inner space 401 is formed through a combination of the upper body 411, the variable body 412, and the lower body 413.

The liquid is introduced into the inner space 401 of the body 410 through the liquid introducing pipe 420. The liquid is supplied to the bubble removing unit 400 through the liquid introducing pipe 420 before being supplied to the substrate W through the liquid supply unit 380. The liquid introducing pipe 420 is coupled to the body 410. The liquid introducing pipe 420 is coupled to an upper outer surface of the body 410. The liquid introducing pipe 420 is coupled to the upper body 411. The liquid introducing pipe 420 is coupled to a large cross-section part 403. The liquid introducing pipe 420 supplies a liquid to the large cross-section part 403.

The liquid discharging pipe 430 is a pipe through which the liquid, from which bubbles are removed in the inner space 401, is discharged. The liquid is supplied onto the substrate W through the liquid supply unit 380 after bubbles are removed in the inner space 401 of the body 410. The liquid discharging pipe 430 is coupled to the body 410. The liquid discharging pipe 430 is coupled to a lower outer surface of the body 410. The liquid discharging pipe 430 is coupled to the lower body 413. The liquid discharging pipe 430 is coupled to a small cross-section part 405. The liquid discharging pipe 430 discharges the liquid from the small cross-section part 405 to the outside.

The bubble discharging pipe 440 is a pipe through which bubbles are discharged to the outside. The bubble discharging pipe 440 is coupled to an upper surface 415 of the body 410. The bubbles generated in the inner space 401 of the body 410 are discharged through the liquid discharging pipe 440.

The inner space 401 of the body 410 is a space for removing bubbles in the liquid supplied from the liquid introducing pipe 420. The inner space 401 includes the large cross-section part 403, a variable cross-section part 404, and the small cross-section part 405.

The variable cross-section part 404 is situated between the liquid introducing pipe 420 and the liquid discharging pipe 430 in the inner space 401 of the body 410. The variable cross-sectional part 404 is situated in the variable body 412. The cross-section of the variable cross-sectional part 404 varies along the lengthwise direction of the body 410. As an example, the cross-section of the variable cross-section part 404 becomes smaller as it goes along the lengthwise direction thereof. The variable cross-section part 404 may have a conic shape, an area of which is larger on the upper surface thereof than on the lower surface thereof.

The large cross-section part 403 is situated on the upper side of the variable cross-section part 404. The large cross-section part 403 is situated in the upper body 411. The large cross-section part 403 extends from one end of the variable cross-section part 404. As an example, the large cross-section part 403 extends from an upper portion of the variable cross-section part 404. The cross-section of the large cross-section part 403 is larger than the cross-section of the variable cross-section part 404. The cross-section of the large cross-section part is uniform along the lengthwise direction thereof. The large cross-section part 403 may be situated in the upper body 411. The large cross-section part 403 is connected to the liquid discharging pipe 430. A bubble discharging pipe 440 is connected to the large cross-section part 403. The liquid discharging pipe 430 is connected to a side surface of the large cross-section part 403, and the bubble discharging pipe 440 is connected to an upper portion of the large cross-sectional part 403.

The small cross-section part 405 is situated on the lower side of the variable cross-section part 404. The small cross-section part 405 is situated in the lower body 413. The small cross-section part 405 extends from an opposite end of the variable cross-section part 404. As an example, the small cross-section part 405 extends from a lower portion of the variable cross-section part 404. The cross-section of the small cross-section part 405 is smaller than the cross-section of the variable cross-section part 405. The cross-section of the small cross-section part is uniform along the lengthwise direction thereof. The small cross-section part 405 may be situated in the interior of the lower body 413. The small cross-section part 405 is connected to the liquid discharging pipe 430.

The liquid introduced from the liquid discharging pipe 430 sequentially passes through the large cross-section part 403, the variable cross-section part 404, and the small cross-sectional part 405. Bubbles are removed from the liquid while the liquid passes through the large cross-section part 403, the variable cross-section part 404, and the small cross-sectional part 405.

Although it has been exemplified that the large cross-section part 403 is situated on the upper side of the variable cross-section part and the small cross-section part 405 is situated on the lower side of the variable cross-section part, the inventive concept is not limited thereto, but the large cross-section part 403 may be situated on the lower side of the variable cross-section part 404 and the small cross-section part 405 may be situated on the upper side of the variable cross-section part 404.

Figure 6:
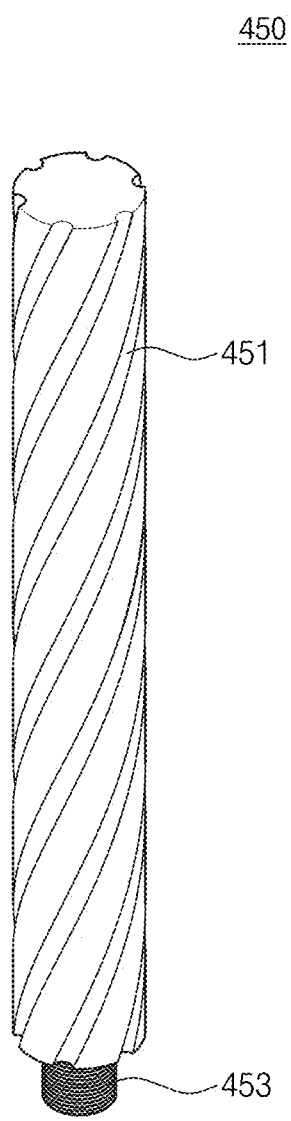
FIG. 6 is a perspective view illustrating a bar of FIG. 4.
Figure 7:
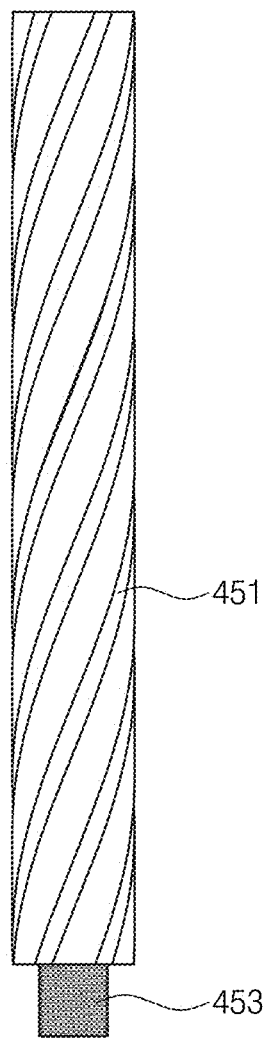
FIG. 7 is a front view illustrating the bar of FIG. 4.

FIG. 6 is a perspective view illustrating a bar of FIG. 4. FIG. 7 is a front view illustrating the bar of FIG. 4. Hereinafter, referring to FIGS. 6 and 7, a bar 450 is provided in the inner space 401 of the body 410. The bar 450 is situated in the inner space 401. The length of the bar 450 extends along the lengthwise direction of the body 410. The bar 450 has a rod shape. The bar 450 is coupled and fixed to a coupling recess 429 formed on a bottom surface 426 of the body 410. At least one spiral groove 451 is formed on an outer surface of the bar 450. A plurality of spiral grooves 451 are provided. The spiral groove 451 has a cyclone shape on an outer surface of the body 410. The direction of the spiral groove 451 is opposite to a direction in which the liquid swirls along an inner wall of the body 410 when the liquid is introduced from the liquid introducing pipe 420 into the inner space 401. As an example, the direction may be a counterclockwise direction.

A screw thread 453 coupled to the coupling recess 419 is formed at a lower portion of the bar 450. The height of the bar 450 is larger than the height of the small cross-section part 405. The uppermost surface of the bar 450 is situated at a location lower than the upper side of the variable cross-section part 404. The height of the bar 450 is smaller than the sum of the heights of the variable cross-section part 404 and the small cross-section part 405 as a whole.

Hereinafter, a process of removing bubbles by the bubble removing unit 400 will be described.

Figure 8:
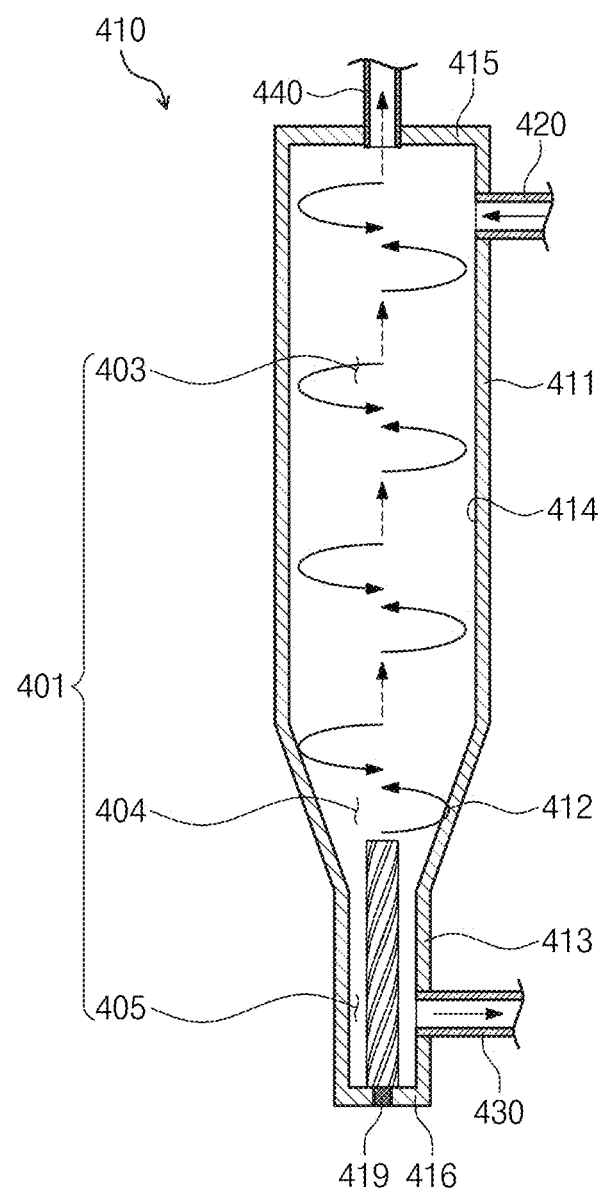
FIG. 8 is a view schematically illustrating flows of a liquid introduced into the bubble removing unit of FIG. 4.

The liquid supplied from the outside is introduced into the inner space 401 through the liquid discharging pipe 430. The liquid introduced into the inner space 401 swirls in a specific direction along the inner wall of the body 410. As an example, the direction in which the liquid may be a clockwise direction as illustrated in FIG. 8. The liquid flows to the lower side of the body 410 while swirling due to a difference between the pressures of a central area and a peripheral area of the inner space 401. The variable cross-section part 404 is situated in the inner space 401, and the cross-section of the variable cross-section part 404 becomes smaller as it goes towards the lower side so that a centrifugal force of the liquid may be remarkably improved while the liquid flows to the lower side of the body 410. In this process, an ascending current is generated at the center of the inner space due to the spiral groove 451 of the bar 450. Due to the spiral groove 451 formed in a direction opposite to the direction in which the liquid swirls, an ascending flow, such as a cyclone, is generated due to a difference between the pressures of the central area and the peripheral area of the inner space is generated at the central area. The ascending flow allows the bubbles in the liquid to be discharged through the bubble discharging pipe 440

The liquid, from which bubbles are removed, is discharged through the liquid discharging pipe 430 connected to a lower portion of the body 410.

Unlike this, when a variable cross-section is not provided in the bubble removing unit 400 and a spiral groove 451 is not formed in the bar 450, a centrifugal cannot be remarkably improved when the liquid flows from the upper side to the lower side, and a bubble removal rate by which bubbles are removed form the liquid is low because an ascending flow is not formed at a central area of the inner space.

Meanwhile, in the embodiment of the inventive concept, a centrifugal force increases as the liquid goes towards the lower side, and bubbles may be removed from the liquid by forming an ascending flow at a central area of the inner space.

The efficiency of the process of treating a substrate W may be improved when a liquid treating process is performed by supplying a liquid to the substrate W because bubbles are removed from the liquid supplied onto the substrate W by the bubble removing unit 400.

Although an apparatus for cleaning a substrate by using the bubble removing unit 400 has been exemplified, the inventive concept is not limited thereto but an apparatus for performing a process of treating a substrate by supplying a liquid to a substrate may be provided to remove bubbles from the liquid.

According to an embodiment of the inventive concept, the efficiency of a substrate treating process can be provided by providing a bubble removing unit that removes bubbles in a liquid supplied onto a substrate.

The effects of the inventive concept are not limited to the above-mentioned effects, and the unmentioned effects can be clearly understood by those skilled in the art to which the inventive concept pertains from the specification and the accompanying drawings.

The above description exemplifies the inventive concept. Furthermore, the above-mentioned contents describe the exemplary embodiment of the inventive concept, and the inventive concept may be used in various other combinations, changes, and environments. That is, the inventive concept can be modified and corrected without departing from the scope of the inventive concept that is disclosed in the specification, the equivalent scope to the written disclosures, and/or the technical or knowledge range of those skilled in the art. The written embodiment describes the best state for implementing the technical spirit of the inventive concept, and various changes required in the detailed application fields and purposes of the inventive concept can be made. Accordingly, the detailed description of the inventive concept is not intended to restrict the inventive concept in the disclosed embodiment state. Furthermore, it should be construed that the attached claims include other embodiments.

What is claimed is:

1. A bubble removing unit comprising:
    a body having an inner space, through which a liquid can flow;
    a liquid introducing pipe through which the liquid can be supplied to the body;
    a liquid discharging pipe through which the liquid, from which bubbles are removed, can be discharged from the body;
    a bubble discharging pipe through which the bubbles can be discharged from the inner space; and
    a rod-shaped bar situated in the inner space and a length of which extends in a lengthwise direction of the body,
    wherein a variable cross-section part situated between the liquid introducing pipe and the liquid discharging pipe and a cross-section of which varies along the lengthwise direction of the body is provided in the inner space of the body; and
    wherein the bar has a spiral groove on an outer surface thereof in contact with the liquid.

2. The bubble removing unit of claim 1, wherein a large cross-section part is situated at any one of an upper portion and a lower portion of the variable cross-section part, extending from one end of the variable cross-section part, and having a cross-section that is greater than that of the variable cross-section part, and
    a small cross-section part is situated at the other of the upper portion and the lower portion of the variable cross-section part, extending from an opposite end of the variable cross-section part, and having a cross-section that is smaller than that of the variable cross-section part are further provided in the inner space of the body.

3. The bubble removing unit of claim 2, wherein the liquid introducing pipe is connected to the large cross-section part, the liquid discharging pipe is connected to the small cross-section part, and the large cross-section part is situated at a location higher than that of the small cross-section part.

4. The bubble removing unit of claim 3, wherein the bubble discharging pipe is connected to an upper surface of the body.

5. The bubble removing unit of claim 2, wherein the large cross-section part and the small cross-section part each have uniform cross-sections along lengthwise directions thereof.

6. The bubble removing unit of claim 1, wherein a cross-section of the variable cross-section part becomes smaller as it goes along a lengthwise direction thereof.

7. The bubble removing unit of claim 6, wherein the variable cross-section part has a conic shape, an area of which is larger on an upper surface thereof than on a lower surface thereof.

8. The bubble removing unit of claim 2, wherein a coupling recess, to which the bar is fixed, is formed on a bottom surface of the body, and the bar is coupled to the coupling recess.

9. The bubble removing unit of claim 3, wherein a height of the bar is larger than a height of the small cross-section part, and an uppermost surface of the bar is situated at a location lower than an upper side of the variable cross-section part.

10. The bubble removing unit of claim 1, wherein the liquid introducing pipe is connected to an inner wall of the body in a tangential direction of the inner wall such that the liquid can swirl along the inner wall when the liquid is introduced into the inner space.

11. The bubble removing unit of claim 10, wherein the spiral groove is formed in a direction opposite to a direction in which the liquid swirled in the inner space.

12. An apparatus for treating a substrate, the apparatus comprising:
    a container having a treatment space in an interior thereof;
    a support unit situated in the treatment space to support the substrate;
    a liquid supply unit to supply a liquid to a substrate positioned on the support unit; and
    a bubble removing unit to remove bubbles from the liquid supplied by the liquid supply unit,
    wherein the bubble removing unit comprises:

a body having an inner space, through which a liquid can flow;

a liquid introducing pipe through which the liquid can be supplied to the body;

a liquid discharging pipe through which the liquid, from which bubbles are removed, can be discharged from the body;

a bubble discharging pipe through which the bubbles can be discharged from the inner space and connected to an upper surface of the body; and a rod-shaped bar situated in the inner space and a length of which extends in a lengthwise direction of the body, wherein a variable cross-section part situated between the liquid introducing pipe and the liquid discharging pipe and a cross-section of which varies along the lengthwise direction of the body is provided in the inner space of the body, and wherein the bar has a spiral groove on an outer surface thereof in contact with the liquid.

13. The apparatus of claim 12, wherein a large cross-section part is situated at any one of an upper portion and a lower portion of the variable cross-section part, extending from one end of the variable cross-section part, and having a cross-section that is greater than that of the variable cross-section part, and a small cross-section part is situated at the other of the upper portion and the lower portion of the variable cross-section part, extending from an opposite end of the variable cross-section part, and having a cross-section that is smaller than that of the variable cross-section part, and the liquid introducing pipe is connected to the large cross-section part, the liquid discharging pipe is connected to the small cross-section part, and the large cross-section part is situated at a location higher than that of the small cross-section part.

14. The apparatus of claim 13, wherein the large cross-section part and the small cross-section part each have uniform cross-sections along lengthwise directions thereof.

15. The apparatus of claim 12, wherein the variable cross-section part has a conic shape, an area of which is larger on an upper surface thereof than on a lower surface thereof.

16. The apparatus of claim 13, wherein a coupling recess, to which the bar is fixed, is formed on a bottom surface of the body, and the bar is coupled to the coupling recess.

17. The apparatus of claim 16, wherein a height of the bar is larger than a height of the small cross-section part, and an uppermost surface of the bar is situated at a location lower than an upper side of the variable cross-section part.

18. The apparatus of claim 12, wherein the liquid introducing pipe is connected to an inner wall of the body in a tangential direction of the inner wall such that the liquid can swirl along the inner wall when the liquid is introduced into the inner space, and the spiral groove is formed in a direction opposite to a direction in which the liquid can swirl in the inner space.

* * * * *